United States Patent

Murthy

[15] 3,700,858

[45] Oct. 24, 1972

[54] DATA PROCESSING SYSTEM EMPLOYING PARTICULAR BAR CODE CONFIGURATION

[72] Inventor: Nanjundiah N. Murthy, Redding, Conn.

[73] Assignee: Pitney Bowes-Alpex, Inc., Danbury, Conn.

[22] Filed: Feb. 24, 1971

[21] Appl. No.: 118,224

[52] U.S. Cl ....................235/61.11 E, 235/61.12 R, 340/146.3 Z

[51] Int. Cl. ..............................G06r 7/10, G06r 9/18

[58] Field of Search..340/146.3 A, 146.3 Z, 146.3 C, 340/146.3 K; 235/61.12 M, 61.11 D, 61.11 E, 61.12 R, 61.11 J; 250/219 D

[56] References Cited

UNITED STATES PATENTS

| | | | |
|---|---|---|---|
| 3,044,696 | 7/1962 | Feissel | 340/146.3 Z |
| 3,113,298 | 12/1963 | Poland et al. | 340/146.3 C |
| 3,172,081 | 3/1965 | Cerf | 340/146.3 Z |
| 3,548,377 | 12/1970 | Vaccaro | 340/146.3 C |
| 3,604,899 | 9/1971 | Donohue | 235/61.11 E |

*Primary Examiner*—Thomas A. Robinson
*Attorney*—Arthur J. Plantamura

[57] ABSTRACT

An illustrative embodiment of the invention is directed to an electro-optically readable coded document in which the code appears as a row of printed bars separated by spaces of controlled widths between the individual bars. The substitution of a pair of fine lines, termed a pulse pair, for each bar in the row, substantially enhances code reliability. These pulse pairs, when employed to define bar widths and used in combination with the associated spaces of different widths, constitute a binary code that is registered through an electro-optical system, e.g., a hand held reader which is drawn along the length of the document. Use of pulse pairs permits the generation of pulses of the same polarity, as well as AC coupled circuits that eliminate DC drift in order to provide a system which is less sensitive to differences in contrast variations and reader angle.

8 Claims, 21 Drawing Figures

INVENTOR.
NANJUNDIAH N. MURTHY
BY
Arthur J Plantamura
ATTORNEY.

*INVENTOR.*
NANJUNDIAH N. MURTHY
BY
Arthur J. Plantamura
ATTORNEY.

DATA PROCESSING SYSTEM EMPLOYING PARTICULAR BAR CODE CONFIGURATION

BACKGROUND OF THE INVENTION

This invention relates to an improved data processing system of the kind disclosed in the pending U. S. Pat. application of Berler et al., Ser. No. 58,762, filed on July 28, 1970 titled *Data Processing System and Reader Therefore*

Codes and code "readers" have been used in commercial and industrial applications for many years. The familiar coded tickets that are used in retail merchandise shops for accounting, billing and inventory control purposes are perhaps the most common example of this use. Data, punched into or printed on these tickets often leads to error because of the human factors that usually are involved in the decoding process. As disclosed in the aforementioned Berler et al. application, this source of error is generally overcome through a novel electro-optically readable code that is printed on a document with a series of lines of uniform width or thickness; the spacing between these lines is adjusted so that a combination of lines and spaces constitute a code, e.g., a binary coded decimal system such as the 1, 2, 4, 7 binary code comprised of combinations of "one" bits and "zero" bits. The associated electro-optical reader system deciphers the code as the reading device is moved across the combination of lines and spaces. The line and space groupings as printed on the document are not, however, in a binary coded form. The document preferably initiates a decodable response in a logic network, which, in turn, yields the encoded information in a digital or binary signal.

Each of the printed lines, when registered by the reader, acts as a combination clock or synchronizing mark. The printed line, moreover, serves two purposes simultaneously: it not only acts as a synchronizing mark to indicate that information will follow within a prescribed time; but it also functions as a "one" data bit for a binary coded decimal system when the mark is sensed by the reader after a command or strobe examination signal was generated when the reader passed a line of similar appearance which served as a clock mark.

Illustratively, the lines may be, for example, each three-fourths inch long and 0.015 inch thick. These lines, which preferably are black, are separated from each other by white spaces that can occur in any one of three different widths. Typical widths, for example, are 0.01 inch, 0.02 inch, and 0.03 inch, depending on whether the bit is, respectively, a "ONE," a "ZERO" or a space between coded digits having a single "1" bit in the digit.

In the above described system which is disclosed in the Berler et al. application, Ser. No. 58,762, some difficulty has been experienced on occasion in detecting the edges or bar widths accurately. The problems of accurate edge or width detection are attributed to factors which may include the following:

1. Optical resolution of each bar must be very great.
2. Alternating current techniques lead to phase shift and wave form distortions which often result in bar width measurement variations.
3. Contrast deviations, for example, depart-ures from truly black and white ink and paper, respectively, as registered by the photocell, result in bar width measurement errors.

4. Optical "pen" or probe angle with respect to the scanned ticket, results in an apparent loss of optical resolution which also causes errors in bar width measurement.
5. Electrical signal threshold detection is not sufficiently reliable to provide a basis for accurate bar width or wave form measurement.

The present invention essentially obviates all of these problems.

SUMMARY OF THE INVENTION

The concept employed in practicing the present invention defines each synchronization or information reference index pulse pair by means of two bars that are substantially thinner than, and replace, the much wider individual bars which heretofore comprised the coded array. With respect to signal processing, moreover, the pulse pair as employed herein, triggers pulses of only one polarity instead of generating signals of alternating polarities. Although the code array may trigger pulses of either a positive or a negative polarity, for purposes of describing the invention with greater particularity positive pulse generation will be used. The pulse pairs, for instance, that characterize a binary code bit trigger only positive signal pulses. In this connection, the reader triggers the counter as it senses the first mark of the pulse pair. When the reader detects the second line or mark of the pulse pair, a signal of the same polarity as the first signal is generated to measure pulse pair width to a high degree of accuracy in spite of differences in contrast between mark and mark background and reader angle. This is possible because the same polarity is always used to indicate the trailing mark in the two marks that constitute a pulse pair. This principle enables accurate pulse pair width measurement to be executed without regard to pulse amplitude or pulse threshold discrimination. These monopolar pulses further overcome the inherent electrical systems difficulties that must accompany subsequent counter activation and deactivation with trigger pulses of two polarities.

For a more complete appreciation of the invention, attention is invited to the drawing and detailed description, the scope of the invention being characterized by the claims.

Figure 13:
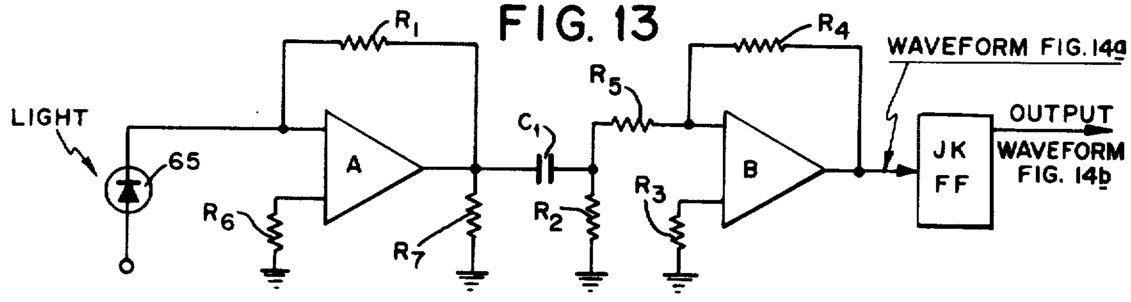
FIG. 13 is a schematic diagram illustrating a typical electrical circuit for use in connection with the invention.
Figure 14A:
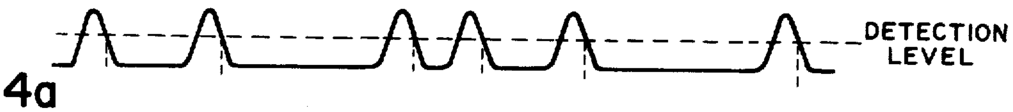
Figure 15:
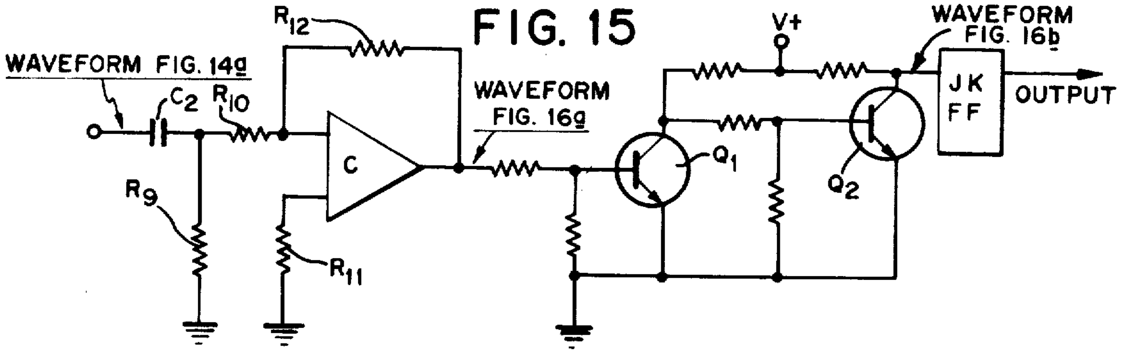
Figure 16A:
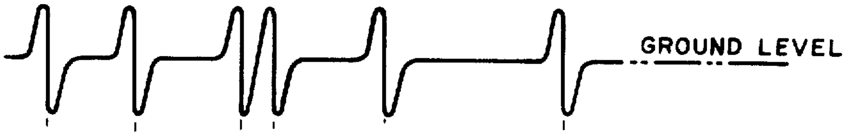

FIG. 14(a) and (b) illustrate a pulse train and the conversion thereof into a modified wave form with the circuit shown in FIG. 13 respectively;

FIG. 15 is a schematic diagram of an alternate circuit for obtaining the desired detection level; and FIGS. 16(a) and (b) and (c) illustrate a pulse train and the conversion thereof with the circuit shown in FIG. 15.

DESCRIPTION OF THE PREFERRED EMBODIMENTS

In order to afford a full understanding and appreciation of the invention, a specific embodiment will be described in conjunction with the bar and space binary system more fully disclosed in the hereinabove referred to pending application, Ser. No. 58,762.

Figure 1:
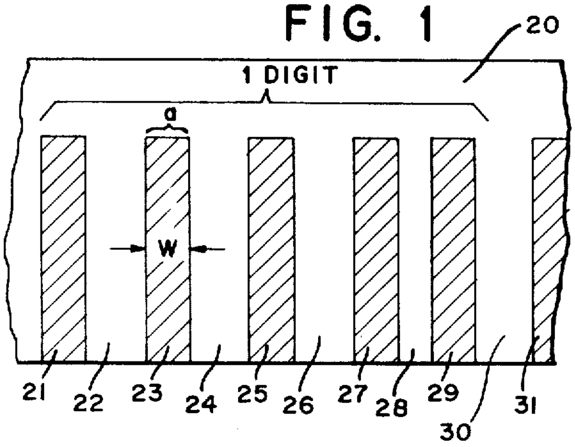
FIG. 1 represents in enlarged detail a portion of a typical code array in the form of lines (or bars) and spaces.
Figure 2:
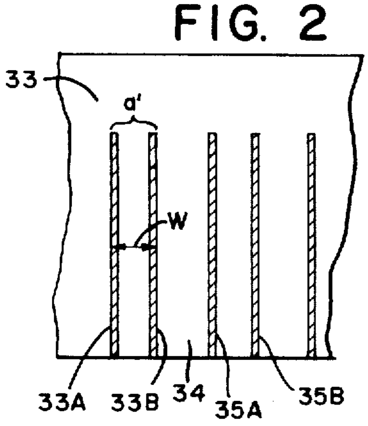
FIG. 2 represents in enlarged detail a portion of a typical code array in the form of the present invention in which pulse pairs are employed in place of the lines or bars of FIG. 1.
Figures 3, 4, 4A, 5, 5A, 6, 7, 8, 9, 10, 11:
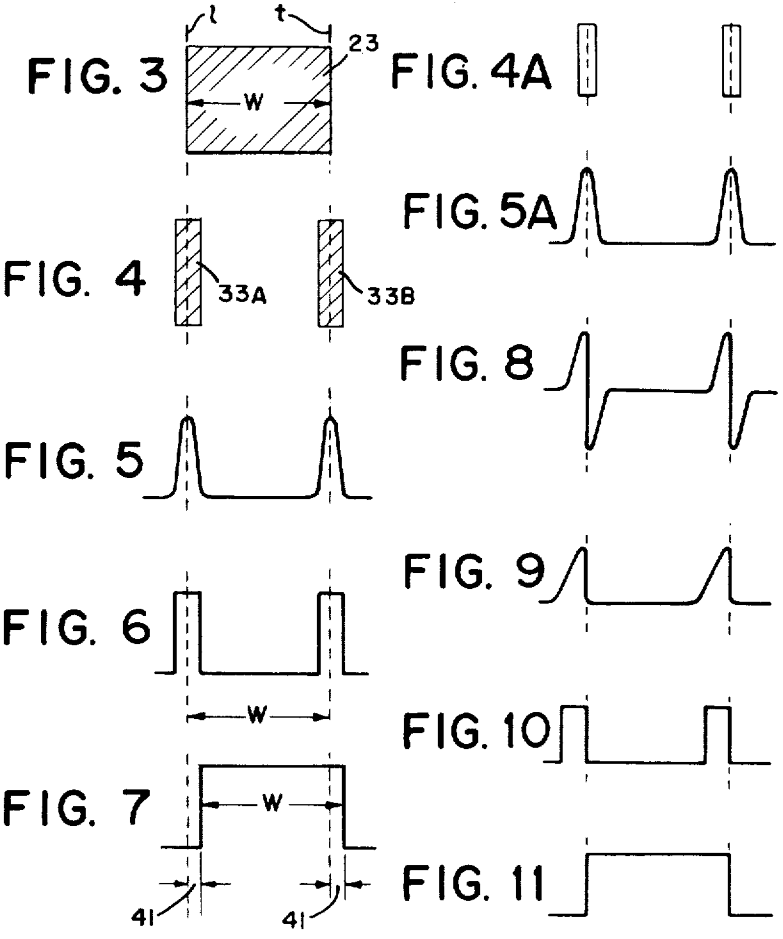
FIG. 3 represents a segment of a line or bar of the type shown in FIG. 1 whose width is sought to be detected.
FIGS. 4 and 4A illustrate the same bar width as that shown in FIG. 3 represented, however, in the pulse pair format that characterizes FIG. 2.
FIGS. 5 and 5A illustrate typical wave form outputs derived from the photo optical reader in response to the pulse pair shown in FIGS. 4 and 4A, respectively.
FIG. 6 shows typical pulses that have been reconstituted from the wave form of FIG. 5.
FIG. 7 shows a wave form that resulted from processing the signal shown in FIG. 5.
FIGS. 8 through 11 illustrate an alternate means of obtaining the desired wave form.

Referring to the figures of the drawing, FIG. 1 represents a segment 20 of a coded document as described more fully in pending U. S. Pat. application Ser. No. 58,762 in which the code comprises an array of printed marks as bars, 21, 23, 25, 27, 29 and 31 in combination with respective varying width spaces 22, 24, 26, 28, 30. As shown in FIG. 2, the pulse widths or bar widths, e.g., 21, 23, etc., of FIG. 1 are replaced in accordance with this invention by pulse pairs shown on the document segment 33, comprising a leading edge line 33A and a trailing edge line 33B which are substantially thinner than the bar 21, 23, etc., of FIG. 1. A second pulse pair 35A and 35B is separated from 33*b* by space 34. In the decoding process, it is necessary to measure the width W, i.e., bar *a* shown in FIG. 1 or bar $a^1$ shown in FIG. 2. In converting the width W to a pulse pair, as shown in FIG. 2 and FIG. 4, the extreme leading and trailing edges *l* and *t*, respectively, of the bar 23 (FIG. 3) are redefined by the relatively thin lines 33A and 33B (FIG. 4). With the bar width W so redefined, the electro optical reading device senses the lines 33A and 33B and generates the output signal shown by the wave form of FIG. 5. The signals produced by lines 33A and 33B are regenerated into the wave form shown in FIG. 6 by means of threshold detection with a Schmidt trigger circuit, or the like. The regenerated wave form of FIG. 6 is coupled to a simple JK flip flop circuit or other toggling circuit to generate the wave form shown in FIG. 7. It should be noted that the width W of the FIG. 7 wave form, although displaced by constant rise (or fall) delay time distances 41, is equal to the width W of the bar 23 (FIG. 1) or the pulse pair 35A and 35B (FIG. 2). By using pulse pairs for bar widths as illustrated and described above, the reliability in reading a line and space code of the type described is substantially enhanced. This technique, moreover, permits AC coupled circuits and pulse shaping as shown in FIG. 6.

Alternatively, a wave form that is essentially the equivalent of the FIG. 7 wave form can be obtained from the electro optical reader signal shown in FIG. 5A. The FIG. 5A signal is sent through a differentiating circuit to produce a signal shown in FIG. 8 that corresponds to the first derivative of the reader output. The negative lobes of the first derivative are removed through a transistor network, or the like, to provide the signal shown in FIG. 9. A Schmitt trigger regenerates these pulses as indicated in FIG. 10 so that a toggling circuit can provide the pulse shown in FIG. 11. The width W always is measured accurately without regard to the amplitude of the reader signal, and this does not depend on the luminous contrast between the bars or marks and the surrounding paper. The system, moreover, is made less sensitive to variation in contrast because pulses of the same polarity are used to indicate only the leading (or trailing) lines, i.e., to sense the pulse pairs in which the leading line of the pair starts the counter and the trailing line of the pair stops the counter to enable the system to "learn" the length of time required to scan the electro-optical reading device across the width W (FIG. 2). Thus, the intensity of ink used to print the code, whiteness of paper, variations in intensity of light during detection, angle of illumination, angle of detection and other variables which would otherwise tend to lessen the system accuracy have little adverse influence when pulse pairs are used to establish the bar width.

Figure 12:
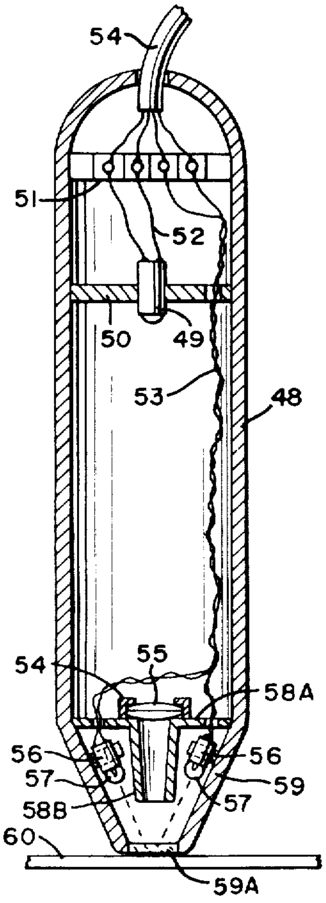
FIG. 12 illustrates a typical photo optical reader which may be employed in reading the coded document of the invention.

A reader of the type which may be employed to photo-optically decode a document that characterizes the invention is depicted in FIG. 12. The unit comprises a light tight housing 48 which terminates in a conical tip portion 59 which has formed at the end thereof an opening 59A through which is transmitted the luminous contrasts that comprise the data on document 60. Mounted internally near the tip of the reader is a combination light baffle, lens and light source support which comprises a lens enclosure or cell 54 for the lens 55, a horizontal baffle portion 58A and a conical baffle portion 58B. The opening in the conical portion 58B is aligned with the lens 55 and a photoelectric sensor 49. The baffle arrangement 58A and 58B prevents an undesirable activation of a photosensor 49 through stray light from lamps 56. The photosensor is secured to a suitable support 59 and connected through conductors 52, the terminal strip 51 and the cable 54 to a data processing system (not shown in FIG. 12). Also, the conductor to supply the light source 56 and photosensor 49 also are connected through the terminal strip 51. Although a single lamp 56 may provide sufficient illumination, it is preferable to use a system of at least three lamps to provide adequate light intensity in all operating conditions and better assurance again malfunction from lamp failure. Lamps 56 with lens tips 57 preferably are oriented to concentrate or focus the light into one bright spot on the document 60.

In order to resolve the line pattern on the coded printed document, the reader has an area spot resolution that is equal to, or smaller than the width of the thinnest line or space. The illumination from one or more lamps may use a lens to focus the light on a spot, or may use "fiber optic" light pipes within the housing 48.

Reference to FIG. 13 shows a schematic diagram in which the photo diode 65 is coupled to an operational amplifier A. The amplifier A is coupled to an operational amplifier B through a resistance-capacitance network $R_2C_1$. In the configuration shown, amplifier A acts as a current to voltage transformation circuit, i.e., the photo diode current is amplified and presented as a voltage at the output of amplifier A. The resistivecapacitive network coupling the amplifiers A and B passes all of the pulses generated by the photo diode 65. Coupling through the $R_2C_1$ network enables the capacitor $C_1$ to block the direct current component of the output from the amplifier A, while passing the pulses. In this way, errors introduced through a long term DC drift in the output of the amplifier are avoided. Amplifier B has a conventional output to input feedback resistor $R_4$ that regulates the overall "gain" or amplification of the circuit B through the ratio of the resistance $R_4$ to a resistance $R_5$ at the input to the amplifier B.

Figure 14B:
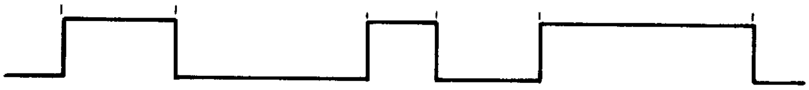

An amplified pulse of adequate strength is provided at the output of the amplifier B. This amplified pulse is applied to a flip flop circuit FF whose output changes from a high voltage to a low voltage (toggle action), or vice-versa, in response to each input pulse above a predetermined noise rejecting detection level. Illustratively, any of the integrated circuit toggle or JK flip flops are suitable for this purpose. A typical flip flop input signal for the circuit illustrated by the diagram of FIG. 13 is shown in FIG. 14A. The output signal from the flip flop FF is a wave form shown in FIG. 14(b). It is thus evident that in taking the individual pulse pair 33 (FIG. 2), when processed in the above-described circuit provide all of the advantages of alternating current coupling to generate pulses of time durations that match the speed with which the electro optical device (FIG. 12) is being scanned through the distance W between the leading and trailing edge lines 33A and 33B (FIG. 2). Appropriate logic circuits of the type described in the aforementioned Berler et al patent application respond to the pulse train at the output from the flip flop FF by generating a binary coded signal output, or the like. This technique of defining bar widths with pulse pairs can be used wherever variable pulse width codes or techniques are used. The foregoing method shown in FIG. 14 relies, to a certain extent, on the fact that an input pulse of a certain minimum detection level or threshold amplitude is required to toggle the flip flop FF.

Reference to FIG. 15 shows another technique for obtaining the foregoing result, i.e., by taking the first derivative of the wave form obtained from amplifier B. The output wave form obtained from the amplifier B as shown in FIGS. 13 and 14(a) is applied to a differentiating capacitance network $R_9C_2$ of FIG. 15. In this case, the values of $R_9$ and $C_2$ are chosen to produce a wave form at the junction of $R_9$ and $C_2$ that is an analog of the first derivative ($d/dx$) of the output wave form 14(a) from the amplifier B of FIG. 13. A typical analog derivative signal at the output of the $C_2R_9$ network of FIG. 15 is shown in FIG. 16(a). Amplifier C is a conventional feedback device which amplifies this differentiated signal. Through appropriate adjustment, the signal output from the amplifier C alternates from a positive to a negative polarity about a zero voltage or ground potential.

Figure 16B:
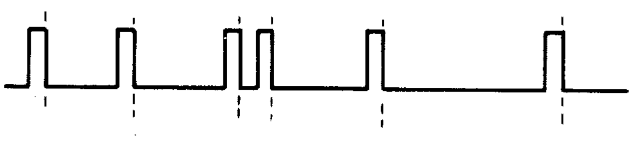
Figure 16C:
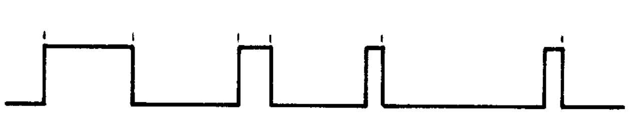

A pair of common emitter transistors $Q_1$ and $Q_2$ (FIG. 15) suppress the negative portions of the output signal from the amplifier C by virtue of the circuit configuration. These transistors also reshape the wave form to provide the signal shown in FIG. 16(b). The FIG. 16(b) signal is applied to a toggle flip flop FF in order to obtain wave form 16(c), which is the same as the FIG. 14(b) wave form. This first derivative technique provides a somewhat greater accuracy than the threshold detection method described in connection with FIG. 13 pulses. In this way, moreover, alternative current phase shift problems are overcome and monopolar pulses are available to initiate and terminate logic circuit counter operation.

In operation, as described in more completed detail in the aforementioned Berler et al. application, Ser. No. 58,762, the binary notation may be coded in any suitable form. In particular, the invention is described in conjunction with a modified 1-2-4-7 notation in which no more than two "one" bits areneeded to represent any digit in a decade. As described in the aforementioned copending application, Ser. No. 58,762, the spacing between bits is so controlled that the space required to represent each of the digits is the same. Each mark or bar, moreover, functions as a clock mark. Following each mark, and depending on the space interval or separation between successive marks, the logic system will determine if the data is a "ZERO" or a "ONE" bit, or a space. As the electro-optical reader passes over the array of printed marks, variations in the light intensity reflected from the document under observation cause the reading device to sense each mark passed over. Stimulation from the mark will start one of two available counters to begin counting "up" at a predetermined rate. When the reader senses the next mark, the counter is stopped. At that point, the command is issued to an associated circuit to generate a strobe pulse that interrogates the system logic and determine whether the second counter also is counting and thereby underate whether the detector has sensed a pulse pair or a space between a pulse pair. For example, if during this interrogation, the electro optical reading device is positioned between a pulse pair, i.e. a "bar" is sensed, both counters will be active and counting. This situation is registered by the reader as a "one" bit and is applied to the system logic. If, on the other hand, at the time the strobe or interrogation command is executed, it is determined that both counters have stopped, a signal is generated to indicate that a reader position outside of any pulse pair has been reached, i.e., a space is sensed. In this latter instance, the system logic responds by indicating a "ZERO" bit. Accordingly, the separation or spacing between pulse pairs designate the code elements. All wide spaces between pulse pairs, that is, spaces wider than those which ordinarily are occupied by a pulse pair, decode into an "0" bit. The last "0 " bit may be, for example, a standard size wide space (0.02inch) or an extra wide space (0.03 inch or more). A narrow space, i.e. a space of 0.01 inch or less between pulse pairs in the typical illustration, has no bit information itself.

The space between adjacent digits or groups of pulse pairs in the document can be either 0.02 inch or 0.03 inch wide depending on whether the preceding coded digit had one or two "1" bits, respectively. In this regard, a digit containing two "1" bits is shorter than a digit containing a single "1" bit; therefore, the space at the end of a coded digit with two "1" bits in it will be slightly greater. Since each digit in the illustrative embodiment occupies a total space of 0.165 inch, the digit containing two "1" bits will have a space between the last pulse pair for that digit and the first pulse pair of the next digit of 0.03 inch. The digit with one "1" bit in it will have a space of 0.02 inch between the last mark and the first mark of the next coded digit. This space may be arranged, moreover, so that it is actually the fifth bit of a digit, which is always an "0" bit. The maximum size of this space is not critical, although it should never be less than 0.02 inch. It can be, for example, greater than 0.03 inch. It should be noted that these dimensions apply to a specific document that illustrates the principles of the invention. Clearly, dimensions can be varied as required to satisfy particular needs. The line and space format, however, must be preserved in order to indicate the character of the encoded bits.

As hereinbefore noted, two counters are used in the practice of the invention; when the first counter is activated or engaged, i.e., counting between two successive pulse pairs, another mark might be sensed by the reader, For this reason, two counters are used alternately. When one counter is in use, the other waits in alternate sequence. As each mark is sensed by the reader, it will activate either one counter or the other.

This system is characterized by a degree of "self-learning." This feature enables the invention to function at different and changing scan speeds. Typically, a self-learning system of this sort may use a continuously running oscillator that sends a train of pulses through a gate to a counter. The gate is enabled, however, and will pass these pulses to the counter when the leading edge line or a mark in a pulse pair stimulates the reader to generate a gating pulse. During the time that it takes for the reader to traverse the space between pulse pairs, the counter adds, stores, counts, or otherwise remembers the oscillator pulses, which occur at a suitably high rate, or frequency. The reader, on detecting the second mark or trailing edge line of the pulse pair, interrupts or deactivates the counter. At this point an interrogation pulse is triggered to ascertain whether a space or another pulse pair has been detected. This interrogation occurs regardless of the reader scan rate of movement. A slow movement of the reader scan allows the reader to take a longer time to traverse between pulse pairs. The counter will necessarily count up to a higher value during this longer time. The reader, when passing off the second mark of the pulse pair terminates the upcount and, at this point, triggers the strobe or search signal to ascertain the presence or absence of another mark (i.e., the engagement of a counter which has sensed a mark) whether the reader is drawn slowly or quickly over the document.

It will be apparent to those skilled in the art that various modifications may be made in the system set forth with out departing from the spirit of the invention. It is, therefore, understood that the foregoing description and drawing is to be interpreted as illustrative and not as limiting except for such limitations as may be set forth in the claims.

I claim:

1. In a data processing system utilizing a coded document having an array of bars of uniform width in combination with spaces between said bars wherein said code is provided by varying the width of the spaces and wherein electro-optical means are employed to scan said bars and spaces to produce an identifiable output pulse train in response thereto, the improvement comprising substituting said bars with pulse pairs comprising single discrete lines spaced at a distance equal to the width of said bars, the document surface between each of said pairs of lines being devoid of bar forming material.

2. A data processing system according to claim 1 wherein said pulse pairs are separated by variable distances in accordance with a preestablished code in order to record information therein.

3. A system according to claim 1, wherein said output pulse train comprises a series of pulse pairs having variable spacing between pairs, the spacing between the two pulses of all pairs being constant, and a circuit for converting each of said pulse pairs into individual pulses, said circuit comprising a blocking capacitor, an operational amplifier coupled to said blocking capacitor, and a toggling circuit responsive to said operational amplifier.

4. A system according to claim 3, wherein a differentiating circuit is operatively connected between said operational amplifier and said toggling circuit.

5. A circuit according to claim 4 further comprising a pair of emitter coupled transistors for coupling said differentiating circuit to said toggling circuit.

6. A circuit according to claim 5 further comprising another operational amplifier for connecting said differentiating circuit to said transistor pair.

7. A coded ticket comprising a base material, indicia for storing information on the ticket, said indicia being impressed on said base material, said indicia further comprising pairs of parallel lines, each of said lines in every pair being laterally separated from the companion line in said respective pair by equal widths, the spacings between said pairs being varied according to a predetermined code in order to store said information.

8. A coded ticket according to claim 3 wherein said base material color contrasts with said indicia.

* * * * *